(12) United States Patent
Heinz et al.

(10) Patent No.: US 9,569,939 B2
(45) Date of Patent: Feb. 14, 2017

(54) EVENT DETECTOR AND MEDICAMENT DISPENSER HAVING SUCH AN EVENT DETECTOR

(71) Applicant: OECHSLER AKTIENGESELLSCHAFT, Ansbach (DE)

(72) Inventors: Juergen Heinz, Schillingsfuerst (DE); Norbert Krauss, Ansbach (DE)

(73) Assignee: OECHSLER AKTIENGESELLSCHAFT, Ansbach (DE)

( * ) Notice: Subject to any disclaimer, the term of this patent is extended or adjusted under 35 U.S.C. 154(b) by 152 days.

(21) Appl. No.: 14/048,180

(22) Filed: Oct. 8, 2013

(65) Prior Publication Data
US 2014/0097938 A1    Apr. 10, 2014

(30) Foreign Application Priority Data
Oct. 8, 2012    (DE) .................. 20 2012 009 560 U

(51) Int. Cl.
*G08B 5/22*    (2006.01)
*G08B 25/00*    (2006.01)
(Continued)

(52) U.S. Cl.
CPC .............. *G08B 5/00* (2013.01); *G01D 5/2013* (2013.01); *A61J 7/0436* (2015.05)

(58) Field of Classification Search
CPC ......... G08B 7/06; G08B 27/00; G06K 7/0008; G01D 5/485; G01B 7/003; G01F 23/2963
(Continued)

(56) References Cited

U.S. PATENT DOCUMENTS 5,390,673 A * 2/1995 Kikinis ....................... 600/410
8,390,456 B2 * 3/2013 Puleston et al. ........... 340/572.1
(Continued)

FOREIGN PATENT DOCUMENTS

DE          30 08 561 C2    11/1981
DE    10 2005 052 070 A1    5/2007
(Continued)

OTHER PUBLICATIONS

Partial German Search Report dated Feb. 18, 2014 issued in the corresponding European Patent No. 2 717 022 (2 pages).
(Continued)

*Primary Examiner* — George Bugg
*Assistant Examiner* — Anthony D Afrifa-Kyei
(74) *Attorney, Agent, or Firm* — Buchanan Ingersoll & Rooney PC

(57) ABSTRACT

A compact battery-free event detector having a switching element, which can be remagnetized in a bistable manner by a magnet in a sensor coil which then provides an event pulse and supplies a non-volatile memory circuit with a downstream non-volatile display, is designed to detect recurring movements by virtue of the switching element being able to be moved back and forth relative to the magnet between the activation and regeneration fields of its two poles. The manual operation of an inhalation or injection piston in a medicament dispenser can therefore be detected, in particular, and a dose of medicament, for instance, can be monitored thereby. The display is preferably created using e-paper or e-ink technology which, like the memory circuit which is operated only sporadically, obtains its energy needed to change the indication from the event pulse from the sensor coil.

17 Claims, 1 Drawing Sheet

(51) Int. Cl.
*G08B 5/00* (2006.01)
*G01D 5/20* (2006.01)

(58) Field of Classification Search
USPC ....... 340/6.1, 480, 547, 572.6, 815.8, 815.9,
340/957; 324/200, 207.13; 200/9, 13, 14,
200/5 R, 50.02, 50.14, 84 C, 84 R, 19.36;
335/2, 13, 81, 138, 148, 205, 222, 266
See application file for complete search history.

(56) References Cited

U.S. PATENT DOCUMENTS

| | | | |
|---|---|---|---|
| 8,655,615 B2 | 2/2014 | Mehnert et al. | |
| 8,766,625 B2 | 7/2014 | Mehnert et al. | |
| 2003/0131896 A1* | 7/2003 | Yajima et al. | 137/625.65 |
| 2006/0174699 A1* | 8/2006 | Hicks | G01N 19/02 73/104 |
| 2009/0051560 A1* | 2/2009 | Manning | G06F 19/3468 340/691.6 |
| 2009/0105876 A1* | 4/2009 | Simpson | A61J 7/0084 700/242 |
| 2010/0137790 A1* | 6/2010 | Yodfat | 604/67 |
| 2013/0282170 A1* | 10/2013 | Madris | B65D 83/04 700/236 |

FOREIGN PATENT DOCUMENTS

| | | |
|---|---|---|
| DE | 10 2007 039 050 A1 | 2/2009 |
| DE | 10 2007 039 051 A1 | 2/2009 |
| DE | 10 2008 031 795 A1 | 1/2010 |
| DE | 10 2011 012 357 A1 | 8/2012 |
| EP | 1 566 846 A2 | 8/2005 |
| WO | 2007/048855 A1 | 5/2007 |
| WO | 2010/000084 A1 | 1/2010 |

OTHER PUBLICATIONS

Partial German Office Action dated Feb. 2, 2015 issued in the corresponding European Patent Application No. 13 004 823.4-1558 (2 pages).

* cited by examiner

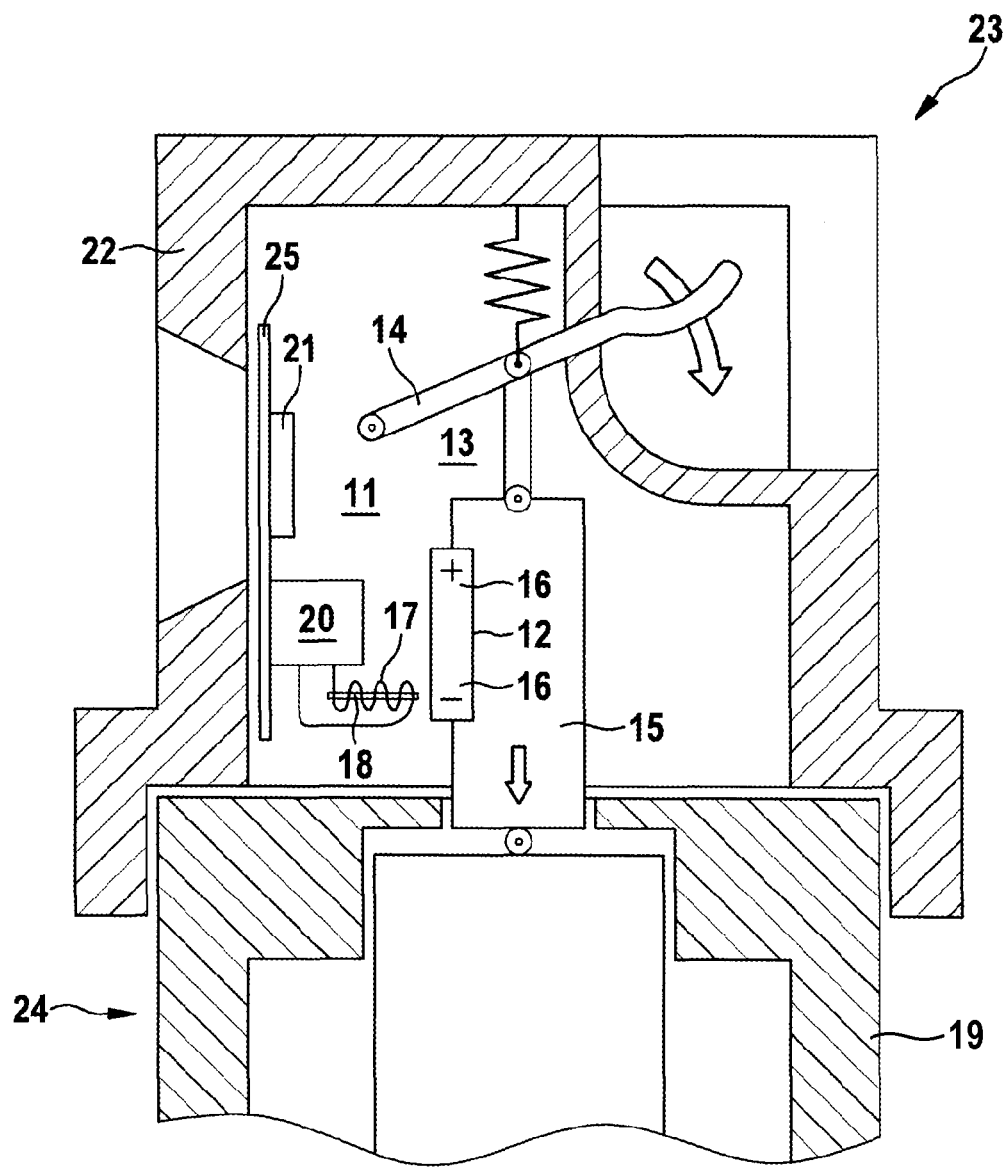

EVENT DETECTOR AND MEDICAMENT DISPENSER HAVING SUCH AN EVENT DETECTOR

The present application claims the benefit under 35 U.S.C. §119 of German Utility Model Application No. 20 2012 009 560.9 filed Oct. 8, 2012, the entire content of which is incorporated herein by reference.

The invention relates to a device for detecting, processing and displaying events, in particular events which are triggered in an erratically recurring manner as a result of muscle power, using a Barkhausen switching element which can be remagnetized in a bistable manner.

Such a switching element is a short structure in the form of a wire having a soft-magnetic core under elastic tensile stress in a sensor coil. In the case of the so-called Wiegand wire, the core is surrounded by a plastically deformed hard-magnetic outer zone and, in the case of the so-called pulse wire, the core is surrounded by a composite material which exerts the tensile stress on the core as a result of the physical properties of its alloying partners. In both cases, a critically increasing external magnetic field results in a sudden reorientation of Barkhausen zones in the mechanically prestressed core. The sharp gradient of this externally initiated field change results in an induction voltage between the output terminals of the sensor coil which coaxially surrounds the Wiegand or pulse wire.

In the case of a fan motor, it is known practice from DE 10 2011 012 357 A1 to equip the fan impeller of said motor with two mutually diametrically opposite, radially oriented rod-shaped permanent magnets which are polarized for the alternate permanent-magnetic activation and regeneration of a Wiegand wire. The sensor coil is arranged in the fan cover in a stationary manner. With a full revolution of the fan impeller, the sensor coil provides a non-volatile counter module with an induced voltage pulse in each case.

DE 30 08 561 C2 describes a switch matrix in the style of a crossbar distributor, at the junction coordinates of which a bistable magnetic switching element having a Wiegand wire is respectively arranged between the row and column lines. At each individual coordinate of these junction coordinates, a rod-shaped permanent magnet can be temporarily displaced transversely in each case, by means of a button which can be manually operated, counter to the force of a restoring spring, into a position in which the Wiegand wire and the rod magnet are coaxially aligned. As a result, the field direction in the Wiegand wire assumes the field direction of the rod magnet. This is retained in a stable manner in the Wiegand wire if the restoring spring transversely displaces the rod magnet from the axis of the switching element again. In the case of a switching element selected via the crossbar matrix, an interrogating current of such a predefined direction and intensity can be subsequently fed into the sensor coil of said switching element that the electromagnetic polarity of the sensor coil results in remagnetization of the Wiegand wire. An induction voltage pulse is then superimposed on this interrogating current as a signal that the Wiegand wire had been placed at this junction coordinate; otherwise, no induction voltage pulse appears owing to a lack of remagnetization. However, the practice of maintaining the manually set magnetization of the switching element until an interrogating current is subsequently fed in and is then used to immediately cancel the magnetization state currently of interest may be functionally critical, for instance on account of the effect of stray fields from the mounting environment of the switching element. The space requirement for axially aligning the permanent magnet with the Wiegand wire is also comparatively large and poorly used. Finally, the circuitry outlay for detecting a current fluctuation on account of an induction voltage pulse possibly triggered by feeding the constant current into the sensor coil proves to be substantially more considerable than it may seem at first. This is because the pulse of an induction voltage makes only a weak instantaneous current contribution to feeding in the current from the high-impedance constant current source if the outlay for separate interrogating current and induction voltage coils is not expended in the case of the switching element.

With knowledge of these conditions, the invention is based on the technical problem of providing an event detector which can be equipped with only a small circuitry outlay and is designed to detect, if necessary to process and also present, mechanical movements which occur with a relatively short stroke in an irregular sequence, as occur, in particular, in the case of successive manual operation of medicament dispensers, for instance for administering injections, for dispensing pills or for activating an inhaler; and of specifying devices which can be advantageously equipped with such an event detector.

According to the invention, this object is achieved with the respective essential features of the independent claims. According to said features, a magnetically bistable Barkhausen switching element, comprising a Wiegand wire or pulse wire in a sensor coil, temporarily moves relative to an electromagnetic or permanent-magnetic dipole with each stroke, in particular each stroke which is instantaneously triggered manually. When one field area is left and the field area of its other dipole magnet pole is entered, a Barkhausen activation threshold is exceeded in the switching element. The abrupt field change triggered thereby triggers an induction voltage pulse of a particular polarity at the sensor coil which is now incidentally deenergized. The switching element then returns again, for instance in a spring-driven manner, to the field area which has previously been left in order to be regenerated, that is to say have its polarity reversed, by the polarity of the field area. A further induction voltage pulse which occurs in the process, for instance, does not need to be evaluated as an event pulse on account of its differing polarity.

A mechanical movement cycle of the magnetic dipole thus provides a non-volatile memory circuit with an event pulse, which memory circuit is temporarily—if necessary via a compact, for instance capacitive, energy store such as an RC element—supplied with operating energy by precisely this event pulse in order to process the current event pulse and, for the rest, remains switched off (namely in the sleep mode). Such a processing circuit, for instance for determining a balancing result, can be designed in a particularly economical manner as a microcontroller or ASIC. According to one expedient development of the invention, the pulse of the other polarity which occurs when reversing the polarity can provide additional operating energy for the temporary operating state of the circuit via a rectifier in a Graetz circuit (bridge rectifier).

In order to visually present the counting result, and possibly information derived therefrom (for instance statistical evaluations or limit value warnings), within the scope of the present invention, a non-volatile display is connected to the counting, processing and memory circuit which is normally not operating. For this purpose, recourse is preferably had to a display having differently electrically charged particles in microcapsules in a transparent viscous polymer behind a transparent substrate, for instance as in the case of so-called e-paper. This is because such a display does not require any maintenance energy for indication—this display consumes a small amount of power only during a change of the instantaneous indication, that is to say only when an event pulse which is then also used to temporarily supply energy occurs. The display is reflective, that is to say passive, and can therefore be easily read even in a bright environment.

Particularly little installation space for the display is required if such electronic paper is formed behind a film or pane of glass which is used as the substrate and, in a manner adapted to its housing environment, may also be installed in a curved manner in or behind a viewing opening. On the visible side, behind such a substrate and in an offset manner beside the indication, the circuit may also be constructed, for instance, as a blank chip using surface-mounting with plastic potting, as can additionally the bistable switching element under certain circumstances with an appropriate spatial arrangement. An embodiment of the e-paper behind a thin pane of glass as the substrate results in a particularly scratch-resistant display in this case; the rear of the pane of glass, away from the display, also equally being able to be fitted with the evaluation circuit for the occurrence of event pulses using a proven chip-on-glass construction technology.

The event detector itself operates, in principle, without batteries, as a result of which, apart from the saving in installation space, the problem of appropriately disposing of a battery at the end of its service life or when use of a device is concluded regularly becomes obsolete.

Only for the situation in which signal processing or else only updating of the indication must be carried out in relatively long periods of time between the occurrence of event pulses is it possible to provide for the event detector to be additionally equipped with a primary battery or a secondary battery or with another energy store for operating the circuit and for reversing the display. An electromagnet can then also be fed from this energy source if preference is to be given once to its broader functionality over the permanent magnet.

The switching element, together with the circuit connected to its sensor coil and possibly together with the display, on the one hand, and the magnet, on the other hand, require such little installation space that they can be easily accommodated in the operating cap or within the base portion of a hand-held container, of a medicament dispenser for instance. In this case, the permanent magnet is advantageously fitted to the functional element (in particular linkage or piston) to be manually moved so that circuit parts to be wired to one another can be arranged, in contrast, in a stationary manner inside the surrounding housing. In the case of medicament applications, this results in a compact dose counter, for instance for asthma inhalers and similar breathing inhalers or insulin injectors.

Other possible uses which are advantageous according to the invention are the practice of equipping sports shoes, for instance, with such event detectors as step counters or equipping other motion-sensitive training devices.

Automotive use of these event detectors which operate, in principle, without batteries affords the particular advantage of still being able to detect and present movement events even after the vehicle voltage has been switched off, with the result that no state changes or other information disappear(s) even after the end of operation.

Programming or read access to the circuit can be enabled via a wired or wireless interface. The instantaneous counter reading stored in a non-volatile manner can then be interrogated and processed further by external electronics. This is particularly expedient if the switching element for triggering event pulses to be balanced in the memory circuit is remagnetized using the alternately appearing poles of a permanent magnet which rotates in a fixed position. Said permanent magnet can be driven, for example, by a flowing fluid or by a longitudinally displaceable threaded spindle. An item of consumption information dependent on the known flow volume or a position change or distance dependent on the known thread pitch is then recorded, for instance, via the interface for the purpose of evaluation.

Additional developments of and modifications to the solution according to the invention emerge from the further claims and, also taking into account their advantages, from the following description of a preferred exemplary realization of the invention which is sketched in the drawing in a greatly enlarged manner not to scale and in a manner reduced to what is functionally essential here. The single FIGURE of the drawing illustrates, in a broken-away axial longitudinal section, the equipping of a medicament dispenser with an event detector which is integrated in a cap and is intended to detect lifting operation.

The sketched event detector 11 is designed to detect and indicate events which appear in a linear or non-linear manner, in particular in the form of manually performed piston strokes or lever pivoting movements. The detector is provided with a magnet 12 of any desired shape, preferably a rod-shaped permanent magnet, on a movable functional element 13. The latter is, for instance, a linkage 14 which can be pivoted by manual operation or a piston 15 which can be moved in a linear manner. The two magnet poles 16 of the magnet 12 are offset with respect to one another in the direction of movement of such a functional element 13, on average approximately by the length of the operating stroke effected with physical strength.

The short linear, magnetically bistable Barkhausen switching element 18 is arranged, with its sensor coil 17, in a stationary manner inside a housing 19 in a manner fixed in the device relative to the movably arranged magnet 12 and preferably in an orthogonal manner with respect to the longitudinal direction and direction of movement of the magnet 12. In principle, however, the magnet 12 may also be conversely installed in a stationary manner and, in contrast, the event detector 11 may incidentally be installed in a movable manner within the scope of the present invention. In addition, the magnet 12 need not necessarily be a linear, horseshoe-shaped or otherwise defined permanent magnet; when a separate energy source is present, for instance for continuously operating a circuit 20, the reversing fields 16+/16− of the magnet poles 16 may also be generated by an electromagnet. This may have the advantage, for example, of being able to individually adapt the magnetic field strengths for reliable switching behavior to the installation and environmental conditions of the switching element 18 via controlled current feeding into the magnet coil.

Only discontinuous pulse processing with a non-volatile memory circuit 20, for instance in $E^2PROM$ or flash technology, is connected to the sensor coil 17. The information from said processing, in particular a balanced pulse counting result or possibly a message derived therefrom, is presented to the outside using a passive display 21 which is likewise non-volatile. The display may be set into a viewing opening in the housing wall 22 or may be arranged behind it—in a planar manner or following its contour. The memory circuit 20 may be created discretely and may be conventionally connected to the display 21. However, it is more expedient, since it is more compact, to directly construct the circuit 20 on the glass or film substrate 25 of the display 21 and to also connect the circuit to the display 21 via said substrate.

In addition, it may be advantageous to design the memory circuit 20 such that it can be influenced via a predefined pulse sequence which can be input manually, for instance via a handle on the linkage 14, in order to reset it to an initial count value again, for instance when replacing a container. For this purpose, the circuit 20 is designed to decrypt at least one predefined pattern in the sequence of event pulses.

The Barkhausen jumps are therefore triggered in the switching element 18 under the influence of a sufficient magnetic field strength of one of the two magnet poles 16, which is also referred to as the activation field 16+ below. The resultant magnetic field change induces an event pulse in the sensor coil 17 which was deenergized until then. This voltage pulse activates the circuit 20 in order to increment the previously stored pulse number by one, for example. At the same time, the voltage pulse activates the display 21 and its information which can be perceived from outside the housing 19 is accordingly updated. As the induction voltage pulse decays, the circuit 20 and the display 21 revert to their waiting position or sleep operating states without an energy requirement, with the presentation of the now updated indication on the display 21 being retained.

If the switching element 18 is moved out of the activation field 16+ relative to the magnet 12 in a spring-loaded manner as a result of the handle of the linkage 14 being released and is moved back toward the regeneration field 16− of opposite polarity and the latter reaches a critical strength, the Barkhausen effect is restored in the switching element 18, that is to say the switching element 18 is reactivated. The voltage pulse induced with opposite polarity in the process is not evaluated as an event pulse but may be supplied to the memory circuit 20 for additional temporary energy supply.

The housing 19 containing the event detector 11 may be, in particular, the cap 23 or the base portion of a hand-held container of e.g. a medicament dispenser 24, being fitted with a pump linkage 14 which can be manually operated and is subjected to loading by a tension spring or compression spring, with the arrangement of the magnet 12 on the pump handling linkage 14 or as sketched directly at the pump piston 15. The case being, such a piston-operated medicament dispenser 24 may be, in particular, a spray inhaler, a pill dispenser or a vaccine container. The medicament taken, which triggers event pulses, is indicated on the display 21, for instance in the form of an absolute number or based on a reference variable such as a daily ration or a critical maximum value.

In principle, without having to take into account battery supply and disposal problems and without having to keep battery installation space, the sensor coil 17 of a switching element 18 which can be remagnetized in a bistable manner therefore supplies discontinuously operating evaluation in a circuit 20 with a non-volatile memory in a compact event detector 11 according to the invention. For this purpose, the switching element 18 can be moved back and forth relative to the magnet 12 between the dipoles 16 of the activation and regeneration fields 16+/16−. The manual operation of an inhalation or injection piston 15 in a medicament dispenser 24 can therefore be detected, in particular, and a medicament dose can be monitored thereby. In order to indicate the event, a non-volatile display 21 is implemented using e-paper or e-ink technology which likewise obtains its energy required only to change the indication from the event pulse of the sensor coil 17 itself, like the circuit 20 obtains its operating energy which is temporarily required only when an event pulse occurs. The circuit 20 can be constructed in a space-saving manner on the rear side of a glass or film substrate 25 of the e-paper display 21 remote from the observer and may be connected to said display.

LIST OF REFERENCE SYMBOLS

11 Event detector (with 18)
12 Magnet (on 13)
13 Functional element (14, 15; in 19)
14 Linkage (on 13)
15 Piston (on 14)
16 Poles (of 12); +/− fields at 16
17 Sensor coil (of 18)
18 Switching element (of 11; with 17)
19 Housing (around 11)
20 Non-volatile memory circuit (downstream of 18, for 21)
21 Non-volatile display (downstream of 20)
22 Wall (of 19, 23)
23 Cap (with 11, 14, upon 19)
24 Medicament dispenser (under 23)
25 Substrate (for 21 and possibly 20/18)

The invention claimed is:

1. An event detector having a Barkhausen switching element surrounded by a sensor coil, a circuit, a passive display which does not require a float voltage, and a magnet arranged to be moved back and forth relative to the switching element whereby the switching element can be remagnetized in a bistable manner by magnetic fields of the magnet as it is moved back and forth relative to the switching element, and wherein the circuit and the passive display are disposed on a glass or film substrate and can be activated by a single voltage pulse from the sensor coil until said pulse decays, whereby an indication of the display is changed by the single voltage pulse after processing thereof by the circuit, said indication representing updated information relating to a count of voltage pulses in a waiting condition without a further energy requirement.

2. The event detector as claimed in claim 1, wherein the magnet is arranged on a functional element which can move relative to the switching element.

3. The event detector as claimed in claim 1, wherein e-paper or e-ink technology is used for the display.

4. The event detector as claimed in claim 1, wherein the circuit is also designed to decrypt a pattern in the sequence of event pulses.

5. The event detector as claimed in claim 1, wherein the circuit is fed from a primary or secondary battery.

6. The event detector as claimed in claim 1, wherein the magnet is a permanent magnet.

7. The event detector as claimed in claim 1, wherein the switching element, including the sensor coil, is mounted fixed relative to the magnet which is, in contrast, movable in a housing.

8. The event detector as claimed in claim 1, wherein the sensor coil of the switching element is arranged in a cap or in a base portion defining a housing equipped with a piston operating linkage of a medicament dispenser.

9. A medicament dispenser having an event detector as claimed in claim 1.

10. The event detector as claimed in claim 2, wherein the functional element comprises a piston or an operating linkage.

11. The event detector as claimed in claim 7, wherein the housing is a cap with a piston operating linkage of a medicament dispenser.

12. The event detector as claimed in claim 11, wherein the display is a bistable curved display and is provided on the cap.

13. The event detector as claimed in claim 1, wherein the circuit is a counting and non-volatile permanent counter reading memory circuit connected to the sensor coil, whereby information from the circuit can be presented using the display.

14. The event detector as claimed in claim 13, wherein the circuit is E2PROM or flash technology.

15. The event detector as claimed in claim 13, wherein the information from the circuit is a balanced pulse counting result or a message derived therefrom.

16. The event detector as claimed in claim 1, wherein the circuit is disposed behind the film substrate as a chip using surface-mounting with plastic potting.

17. The event detector as claimed in claim 1, wherein the switching element comprises a Wiegand wire or a pulse wire.

* * * * *